US006683397B2

(12) United States Patent
Gauthier et al.

(10) Patent No.: US 6,683,397 B2
(45) Date of Patent: *Jan. 27, 2004

(54) ELECTRIC MACHINE HAVING AT LEAST ONE MAGNETIC FIELD DETECTOR

(75) Inventors: Pascal Gauthier, Asnieres-sur-Nouere (FR); Eric Coupart, Angouleme (FR); Jacques Saint-Michel, Angouleme (FR); Christophe Gilles, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 18 days.

This patent is subject to a terminal disclaimer.

(21) Appl. No.: 10/117,031

(22) Filed: Apr. 8, 2002

(65) Prior Publication Data

US 2002/0149275 A1 Oct. 17, 2002

(30) Foreign Application Priority Data

Apr. 17, 2001 (FR) .............................. 01 05190

(51) Int. Cl.[7] .............................................. H02K 11/00
(52) U.S. Cl. .............................. 310/68 B; 310/156.01; 310/254
(58) Field of Search ................... 310/68 B, 156.01, 310/156.02, 156.05, 156.06, 156.07, 156.48, 156.49, 208, 254

(56) References Cited

U.S. PATENT DOCUMENTS

| 871,758 | A | 11/1907 | Heitmann et al. |
| 1,045,159 | A | 11/1912 | Lundell |
| 1,375,699 | A | 4/1921 | Ilg |
| 2,386,673 | A | 10/1945 | Fisher |

(List continued on next page.)

FOREIGN PATENT DOCUMENTS

| DE | 700 420 C | 11/1940 |
| DE | 195 03 610 A1 | 8/1996 |
| DE | 199 03 409 C1 | 7/2000 |
| DE | 19903409 | 7/2000 |
| EP | 0 143 693 | 6/1985 |
| EP | 0 327 470 | 8/1989 |
| EP | 0 365 689 A1 | 5/1990 |
| EP | 0 438 594 A1 | 7/1991 |
| EP | 0 669 699 A1 | 8/1995 |
| EP | 0669699 | 8/1995 |
| EP | 0 777 312 A2 | 6/1997 |
| EP | 0 823 771 A1 | 2/1998 |

(List continued on next page.)

OTHER PUBLICATIONS

U.S. patent application Ser. No. 09/943,808, Coupart et al., filed Apr. 2001.
U.S. patent application Ser. No. 10/121,577, Coupart et al., filed Apr. 2002.
U.S. patent application Ser. No. 10/115,910, Gauthier et al., filed Apr. 2002.
Weinmann, "Application of NdFeB–magnets in motors", XP 000227187, RGE Revue Generale de l'Electricite, No. 4, pp. 45–51, 1991.

Primary Examiner—Thanh Lam
(74) Attorney, Agent, or Firm—Oliff & Berridge, PLC (57) ABSTRACT

An electric machine includes a stator and a permanent magnet flux-concentrating rotor. The permanent magnet flux-concentrating rotor has permanent magnets and pole pieces. The permanent magnets are engaged between the pole pieces. The electric machine also has at least one magnetic-field detector that is mounted on the stator. The at least one-magnetic-field detector is mounted on the stator in such a manner as to detect a magnetic field of the permanent magnets in a location that overlaps a peripheral region of the rotor when the machine if observed on the axis of rotation of the rotor.

13 Claims, 10 Drawing Sheets

U.S. PATENT DOCUMENTS

| | | |
|---|---|---|
| 2,719,931 A | 10/1955 | Kober |
| 3,072,813 A | 1/1963 | Reunst et al. |
| 3,083,311 A | 3/1963 | Krasnow |
| 3,158,770 A | 11/1964 | Coggeshall et al. |
| 3,237,034 A | 2/1966 | Krasnow |
| 3,270,264 A | 8/1966 | Miner |
| 3,281,655 A | 10/1966 | Blasingame |
| 3,334,254 A | 8/1967 | Kober |
| 3,594,597 A | 7/1971 | Kildishev et al. |
| 3,671,788 A | 6/1972 | Knudson et al. |
| 3,879,737 A | 4/1975 | Lunde |
| 3,889,140 A | 6/1975 | Baermann |
| 4,117,360 A | 9/1978 | Richter |
| 4,160,926 A | 7/1979 | Cope et al. |
| 4,219,752 A | 8/1980 | Katou |
| 4,302,693 A | 11/1981 | Burgmeier et al. |
| 4,339,874 A | 7/1982 | McCarty et al. |
| 4,425,521 A | 1/1984 | Rosenberry, Jr. et al. |
| 4,459,500 A | 7/1984 | Miyamoto |
| 4,617,725 A | 10/1986 | Holter et al. |
| 4,618,792 A | 10/1986 | Yates |
| 4,688,951 A | 8/1987 | Guers |
| 4,774,424 A | 9/1988 | Habermann |
| 4,883,981 A | 11/1989 | Gerfast |
| 4,896,839 A | 1/1990 | Curtis, Jr. et al. |
| 5,047,681 A | 9/1991 | Gaillard et al. |
| 5,091,668 A | 2/1992 | Cuenot et al. |
| 5,109,172 A | 4/1992 | Pace |
| 5,162,686 A | 11/1992 | Royer |
| 5,270,645 A | 12/1993 | Wheeler et al. |
| 5,642,013 A | 6/1997 | Wavre |
| 5,693,995 A | 12/1997 | Syverson |
| 5,729,072 A | 3/1998 | Hirano et al. |
| 5,744,888 A | 4/1998 | Zajc et al. |
| 5,744,894 A * | 4/1998 | Cho et al. ............... 310/261 |
| 5,747,909 A | 5/1998 | Syverson et al. |
| 5,760,503 A | 6/1998 | Tsuchida et al. |
| 5,828,147 A | 10/1998 | Best et al. |
| 5,829,120 A | 11/1998 | Uchida et al. |
| 5,838,086 A | 11/1998 | Cuenot et al. |
| 5,841,212 A | 11/1998 | Mita et al. |
| 5,864,192 A | 1/1999 | Nagate et al. |
| 5,909,072 A * | 6/1999 | Muller ............... 310/68 B |
| 5,939,810 A | 8/1999 | Uchida et al. |
| 5,965,967 A | 10/1999 | Liang et al. |
| 6,011,339 A | 1/2000 | Kawakami |
| 6,013,962 A | 1/2000 | Nashiki |
| 6,025,665 A | 2/2000 | Poag et al. |
| 6,031,311 A | 2/2000 | Lee |
| 6,097,120 A | 8/2000 | Horng |
| 6,144,132 A | 11/2000 | Nashiki |
| 6,232,691 B1 | 5/2001 | Anderson |
| 6,313,558 B1 | 11/2001 | Abukawa et al. |
| 6,335,582 B1 | 1/2002 | Abukawa et al. |
| 6,369,473 B1 | 4/2002 | Baumeister et al. |
| 6,388,346 B1 | 5/2002 | Lopatinsky et al. |
| 6,396,181 B1 | 5/2002 | Akemakou |
| 6,400,059 B1 | 6/2002 | Hsu |
| 6,441,525 B1 | 8/2002 | Koharagi et al. |
| 6,448,673 B1 | 9/2002 | Brown et al. |
| 6,525,442 B2 | 2/2003 | Koharagi et al. |
| 6,531,797 B2 | 3/2003 | Eydelie et al. |

FOREIGN PATENT DOCUMENTS

| | | |
|---|---|---|
| EP | 0 866 540 A2 | 9/1998 |
| EP | 0 872 943 A | 10/1998 |
| EP | 0 909 009 A1 | 4/1999 |
| EP | 1 010 660 A1 | 6/2000 |
| EP | 1 050 948 A2 | 11/2000 |
| FR | 2655784 | 6/1991 |
| FR | 2784815 | 4/2000 |
| FR | 2 784 815 | 4/2000 |
| GB | 258981 | 10/1926 |
| JP | A 60-234451 | 11/1985 |
| JP | 2-97262 | 4/1990 |
| JP | A 7-107707 | 4/1995 |
| JP | A 7-264822 | 10/1995 |
| JP | A 9-322455 | 12/1997 |
| JP | A 10-126990 | 5/1998 |
| JP | A 10-146030 | 5/1998 |
| JP | 11-4553 | 1/1999 |
| JP | A 2000-152537 | 5/2000 |
| JP | A 2000-333407 | 11/2000 |

* cited by examiner

FIG_6

FIG_5

FIG_7

FIG_11

FIG_12

FIG_13

FIG_14

FIG_16

FIG_15

FIG_17

FIG_18

FIG_19

ELECTRIC MACHINE HAVING AT LEAST ONE MAGNETIC FIELD DETECTOR

The present invention relates to rotary electric machines and more particularly, but not exclusively, to synchronous electric motors having permanent magnets.

BACKGROUND OF THE INVENTION

In machines having permanent magnets, it is known to use magnetic field detectors in order to know the position of the rotor and to control the excitation of the stator in suitable manner. Known detectors include a Hall effect sensor that is capable of detecting the magnetic field resulting from magnets added to the rotor and therefore distinct from the magnets serving to generate the driving or electromotive force.

OBJECTS AND SUMMARY OF THE INVENTION

The invention may enable to make it easier to build electric machines having permanent magnets.

According to one aspect, the invention provides an electric machine comprising a stator and a permanent magnet flux-concentrating rotor. The rotor may have permanent magnets being engaged between pole pieces. The machine may have at least one magnetic-field detector mounted on the stator in such a manner as to detect the magnetic field of the magnets of the rotor in a location that overlaps a peripheral region of the rotor when the machine is observed on the axis of rotation of the rotor.

Thus, in the invention, it is the magnetic field of the magnets for interacting with the stator that may be detected, such that it may not be necessary to add to the rotor magnets that are intended merely to enable the angular orientation of the rotor to be known. This therefore may simplify manufacture of the rotor.

When the power supply to the motor is polyphase electricity having n phases, the motor preferably includes n detectors fixed on n teeth of the stator, which teeth are advantageously consecutive teeth, thereby facilitating installation of the detectors, access to the detectors, and removal of the electrical conductors connected to the detectors, since all the detectors can be grouped together facing an opening in the case of the motor.

In a particular embodiment, the detectors are fixed on one axial end of the magnetic circuit of the stator and each extends along the axis of a tooth.

In a particular embodiment, each detector includes a Hall effect sensor.

Still in a preferred embodiment, each tooth receives an individual coil which co-operates with the tooth to leave a gap which receives the detector or electrical conductors connected to the detector.

Each individual coil advantageously comprises a bundle of insulated wires, the bundle being substantially flat and wound around a winding axis in such a manner as to form a plurality of superposed turns, the cross-section of the bundle in the superposed turns having a long dimension that extends substantially perpendicularly to the winding axis of the coil. The wires are preferably circular in section, having a diameter that lies in the range 0.3 millimeters (mm) to 2.5 mm, for example. This configuration makes it possible to reduce high frequency losses within the copper at high speeds of rotation of the rotor.

The invention applies more particularly to a motor having a flux-concentrating rotor, the permanent magnets being engaged between pole pieces, the rotor including at least one cheek-plate made of a non-magnetic material, the outside radial edge of the cheek-plate extending slightly set-back from the outside radial edges of the magnets and of the pole pieces in such a manner as to provide an annular region in which the magnetic field can be detected by the above-mentioned detector(s).

Advantageously, the stator has windings on teeth. In a stator with windings on teeth, each tooth serves as the core of a winding. In addition, the number of teeth $n_{teeth}$ is advantageously a function of the number of pairs of poles $n_{pairs}$ and the number of phases $n_{phases}$ in compliance with the relationship $n_{teeth} = n_{pairs} * n_{phases}$.

The combination of a flux-concentrating rotor and a stator with windings on teeth makes it possible to have a machine that is powerful in a small volume, thus making it possible in particular to mount the motor in a cantilevered-out position at the end of a shaft, thereby reducing the number of bearings. The number of teeth and of coils is relatively small, thereby contributing to reducing the cost of the machine.

In addition to a magnetic field sensor, each detector can also include a temperature sensor and the location of the temperature sensor between the coil and the tooth serves to give a good image of the real temperature of the electrical circuit of the corresponding phase.

BRIEF DESCRIPTION OF THE DRAWINGS

Other characteristics and advantages of the present invention will appear on reading the following detailed description of non-limiting embodiments of the invention, and on examining the accompanying drawings, which drawings form an integral portion of the description, and in which.

MORE DETAILED DESCRIPTION

FIGS. 1 to 4 show a synchronous motor 10 of the invention comprising a stator 100 and a rotor 200. The motor 10 is brushless, it has a flux-concentrating rotor, and its stator has windings on teeth, and it operates on three-phase AC.

Figure 1:
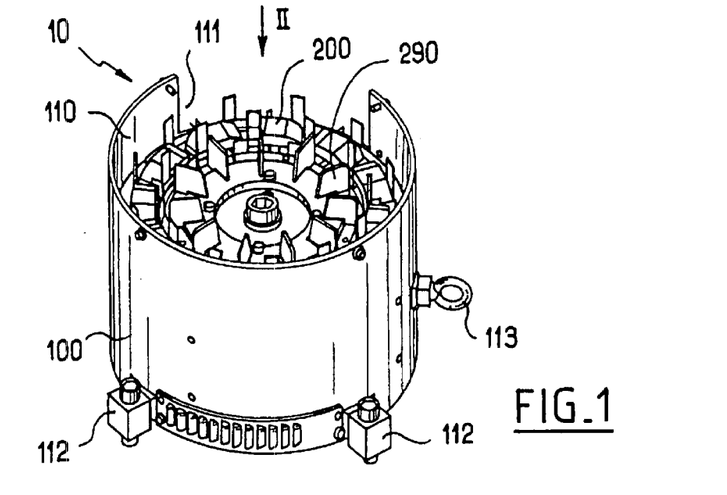
FIG. 1 is a diagrammatic perspective view of a synchronous motor constituting an embodiment of the invention.
Figure 2:
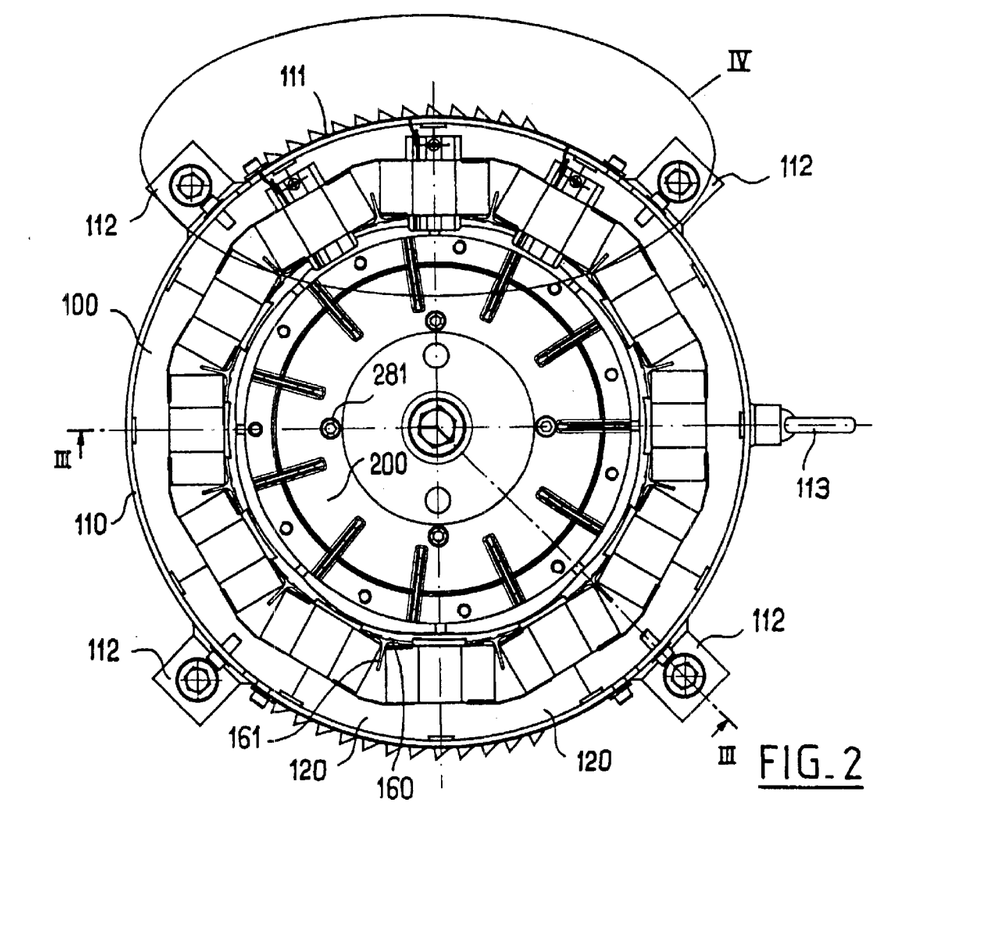
FIG. 2 is a diagrammatic plan view looking along arrow II of FIG. 1.
Figure 3:
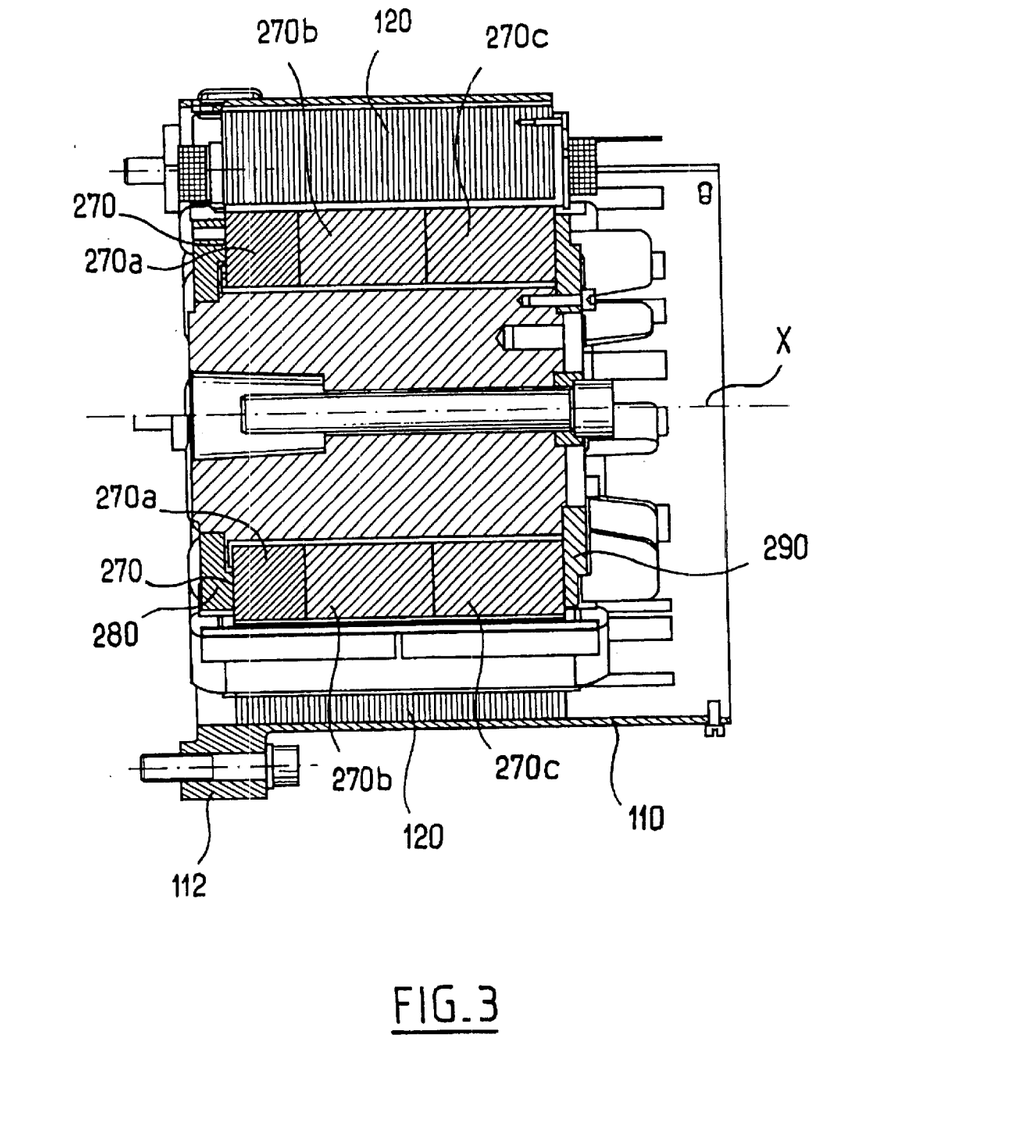
FIG. 3 is a diagrammatic axial section of the motor on III—III of FIG. 2.

The stator 100 has a steel case 110 with a lateral opening 111 in particular for passing electrical conductors for powering the stator windings. On the outside, the case is provided with fixing tabs 112 and with a hook 113 for hoisting purposes.

Figure 6:
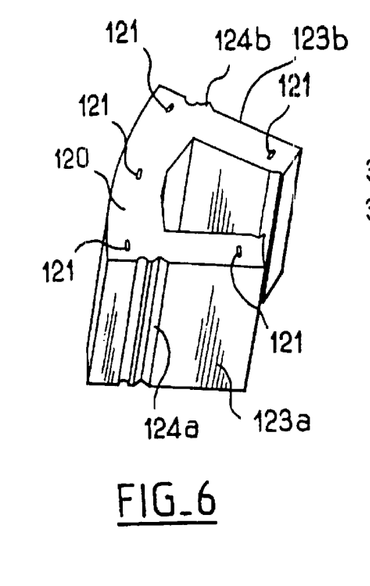
FIG. 6 shows a sector of the magnetic circuit of the stator in isolation and in perspective.

In the example shown, the stator 100 has a magnetic circuit that comprises a plurality of identical sectors 120, one of which is shown in isolation, in perspective in FIG. 6.

Figure 5:
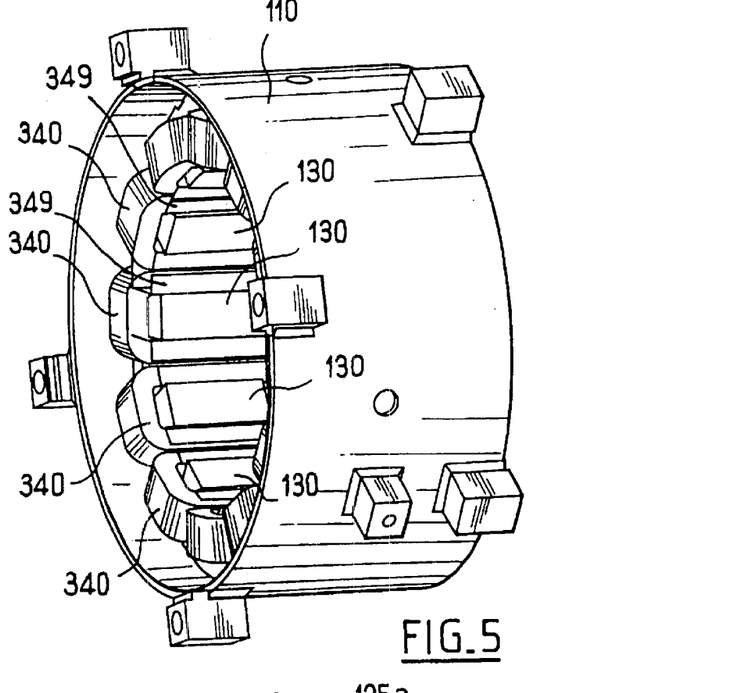
FIG. 5 shows the stator in isolation, in perspective, and in diagrammatic manner.

Each sector 120 is constituted by a stack of identical magnetic laminations that are superposed and clipped together so as to constitute a unitary assembly, with clipping being obtained using a conventional technique whereby each lamination is subjected to spot deformation at a plurality of assembly points 121. Using a stack of magnetic laminations serves to limit losses due to induced currents. In a variant, the magnetic circuit of the stator could be formed by superposing laminations, each of generally annular shape, and then cutting out all of the teeth 130 of the stator therefrom. In another variant, each of the sectors could include a plurality of teeth. When assembled together, two adjacent sectors 120 form a tooth 130, which tooth is used for receiving an individual coil 340, as can be seen in FIG. 5 in particular. The number of teeth $n_{teeth}$ in the example described is twelve, and the motor is designed to be powered with three-phase AC and the rotor has 8 poles. Naturally, the number of rotor poles could be different and in particular it could be equal to 12 or 16, for example. Although presenting certain drawbacks as mentioned above, the stator could also have a number of stator teeth that is not associated with the number of rotor pole pairs $n_{pairs}$ and the number of phases $n_{phases}$ by the relationship $n_{teeth}=n_{pairs}*n_{phases}$.

On its sides 123a and 123b for co-operating with adjacent sectors 120, each sector 120 has respective portions in relief 124a and 124b. These portions in relief 124a and 124b are complementary in shape having a profile that is generally triangular when seen from above, one being recessed and the other projecting, and having two sides that are substantially rectilinear and interconnected by a rounded portion. Co-operation between the portions in relief 124a and 124b contributes to positioning the sectors 120 properly relative to one another while assembling the magnetic circuit of the stator. Each sector 120 also has respective grooves 125a and 125b in its sides 123a and 123b, each groove being of semicircular cross-section and situated in the vicinity of the portions in relief 124a and 124b so that two adjacent grooves together form a hole 125 of circular section when the sectors 120 are assembled together. These holes 125 serve for receiving three detectors 190 as described in greater detail below.

Figure 7:
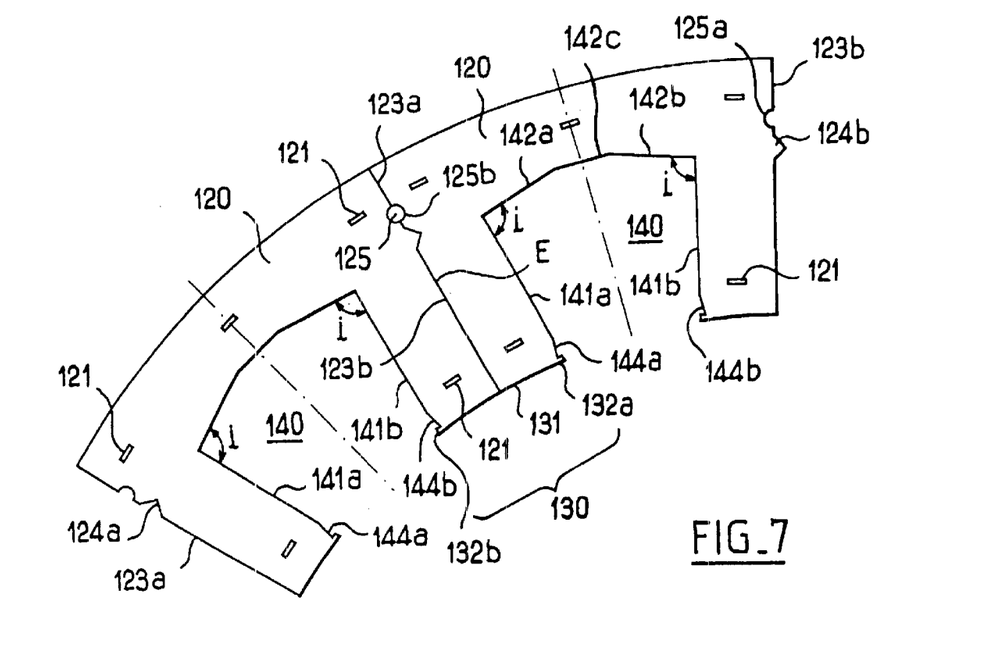
FIG. 7 shows how the FIG. 6 sector is assembled with an identical sector.

In FIG. 7, it will be observed that the air-gap E at the interface between two adjacent sectors 120 occupies the middle of the corresponding tooth 130, thereby enabling magnetic losses to be reduced while the machine is in operation since magnetic flux can flow from one-half tooth to the adjacent half-tooth within the same sector 120 without encountering an air-gap. In addition, the sectors can be made with elements that are cut out practically without scrap using cutting tools of relatively small size, i.e. tools capable of high rates of throughput.

The sectors 120 are forced as a whole into the cylindrical case 110, and the magnetic circuit formed by the sectors 120 is held together by the radial compression forces exerted by the case 110 on the sectors 120, with the bearing surfaces between sectors being relatively large.

Each sector 120 defines a slot 140 whose opposite sides 141a and 141b are at an angle i of more than 90° relative to the adjacent regions 142a and 142b of the bottom of the slot 140, which regions are themselves perpendicular to radii passing through the line where the corresponding tooth meets the bottom of the slot. In the embodiment shown, the angle i is 90.4°, but this value is merely an example.

Each of the sides 123a and 123b of the sectors is generally in alignment with a radius, ignoring the portions in relief 124a, 124b, 125a, and 125b, and the width of each tooth 130 increases slightly on going away from the rotor (ignoring the cutouts 144a or 144b formed close to its free end 131 facing the rotor).

It will be observed on examining FIG. 7 that in the vicinity of its free end 131 each tooth 130 does not have pole swellings, in contrast to many known stators which present slots that are semi-closed. In the example shown, the end portions 132a and 132b of each tooth 130 situated between the free end 131 and the cutouts 144a or 144b are in alignment with the sides 141a and 141b respectively. The free end 131 is a circularly cylindrical portion on the same axis as the axis of rotation of the rotor, and it is concave towards the rotor.

The bottom of each slot includes a middle region 142c interconnecting the regions 142a and 142b and perpendicular to a radius intersecting the slot 140 at half-width, as represented by chain-dotted lines in FIG. 7.

As mentioned above, each tooth 130 receives an individual coil 340 occupying substantially half of the volume of each of the slots 140 adjacent to the tooth 130 in question.

Figures 8, 9:
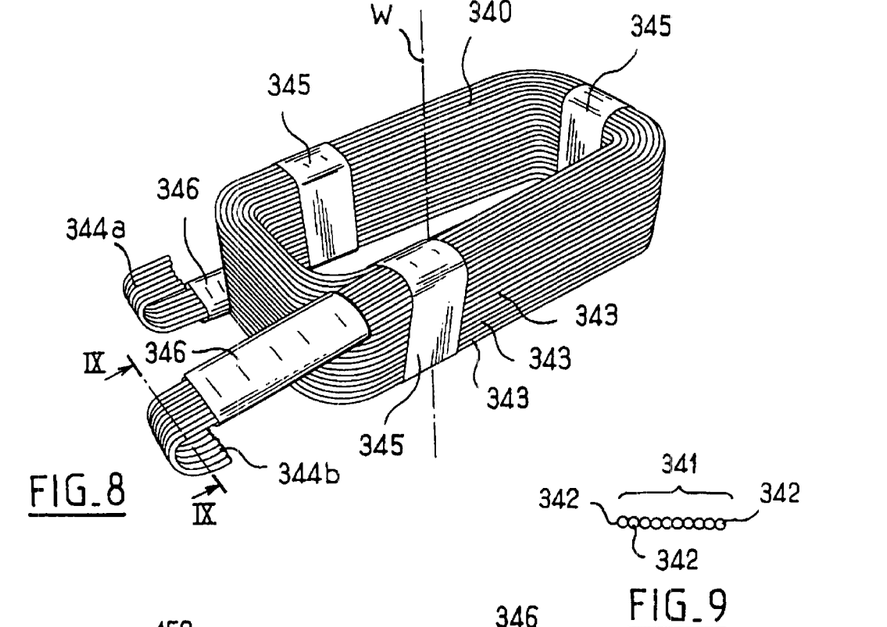
FIG. 8 shows an individual coil in isolation and in perspective.
FIG. 9 is a section on IX—IX of FIG. 8.

FIG. 8 shows an individual coil 340 in isolation. This coil is formed by winding a bundle 341 of enameled electric wires 342 around a winding axis W, the bundle being substantially flat in cross-section, as can be seen in FIG. 9.

When the bundle 341 is observed in cross-section through the turns, its long dimension extends substantially parallel to the winding axis W.

In the example shown, the bundle 341 has ten individual conductors 342, each of circular section. The bundle 341 forms about twenty superposed turns 343. Within the turns, the conductors 342 are electrically insulated from one another by using wire that is enameled. The conductors 342 are stripped at their ends to form electrical connection ends 344a and 344b, each of which is curved towards the midplane of the coil perpendicular to the winding axis W so as to form a hook. At the end of the coil manufacturing process, each of these hooks is open towards the body of the coil.

FIG. 8 shows that all of the conductors 342 at the end 344a are curved upwards and then towards the body of the coil, while the end wires 344b are curved downwards and then towards the body of the coil. The ends 344a and 344b do not project significantly beyond the planes of the two end faces of the coil. The turns constituting the coil body can be held in the superposed state by adhesive strips of cloth 345 prior to being impregnated in resin. Sleeves 346 of insulating sheath are engaged on the portions of the bundle 341 that extend between the ends 344a, 344b and the body of the coil.

Figure 10:
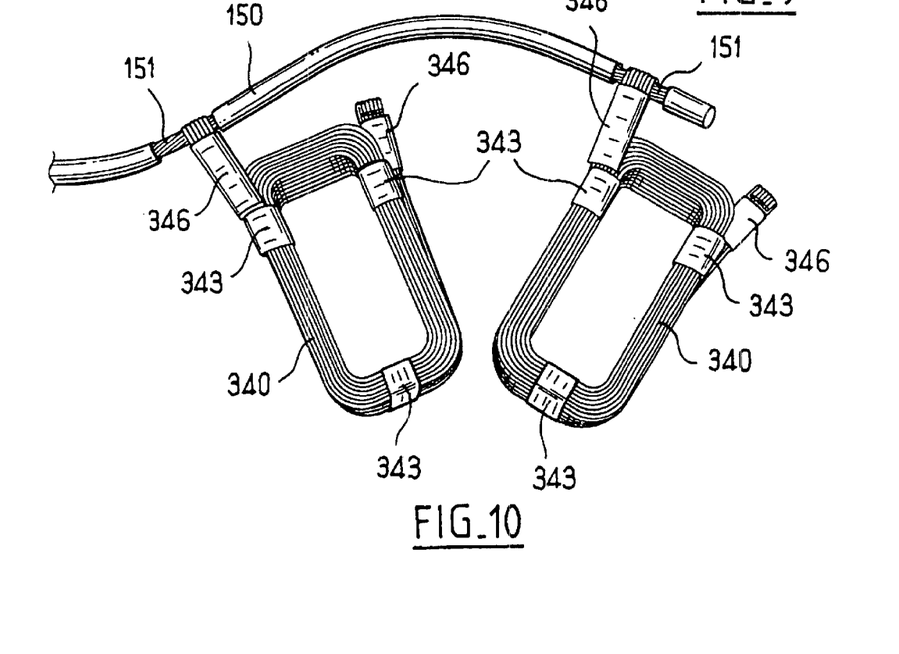
FIG. 10 is a diagram showing a set of coils used for making the stator.

The inside section of the coil 340 is generally rectangular in shape, as can be seen in FIG. 10. The coils 340 are wound on formers having two opposite large faces that are plane, making between them the same angle as between the sides 141a and 141b of a tooth, such that the width of the inside section of each coil varies perceptibly from one end face to the opposite face. This can be perceived if any attempt is made to mount a coil the wrong way round on a tooth 130 of the stator 100.

In FIG. 10, it can be seen that the coils 340 are electrically connected via one or other of the electrical connection ends 344a or 344b to partially-stripped sheathed electrical conductors 150 prior to being mounted on the teeth 130 of the stator 100. The hooks formed by the ends 344a and 344b are arranged, for example, in such a manner as to fit substantially around the outside diameter of the electrical conductors 150 in the stripped portions 151. These stripped portions can be formed not only at the ends of the electrical conductors 150 but also between them, by removing a limited length of insulating plastics material sheath.

Figure 11:
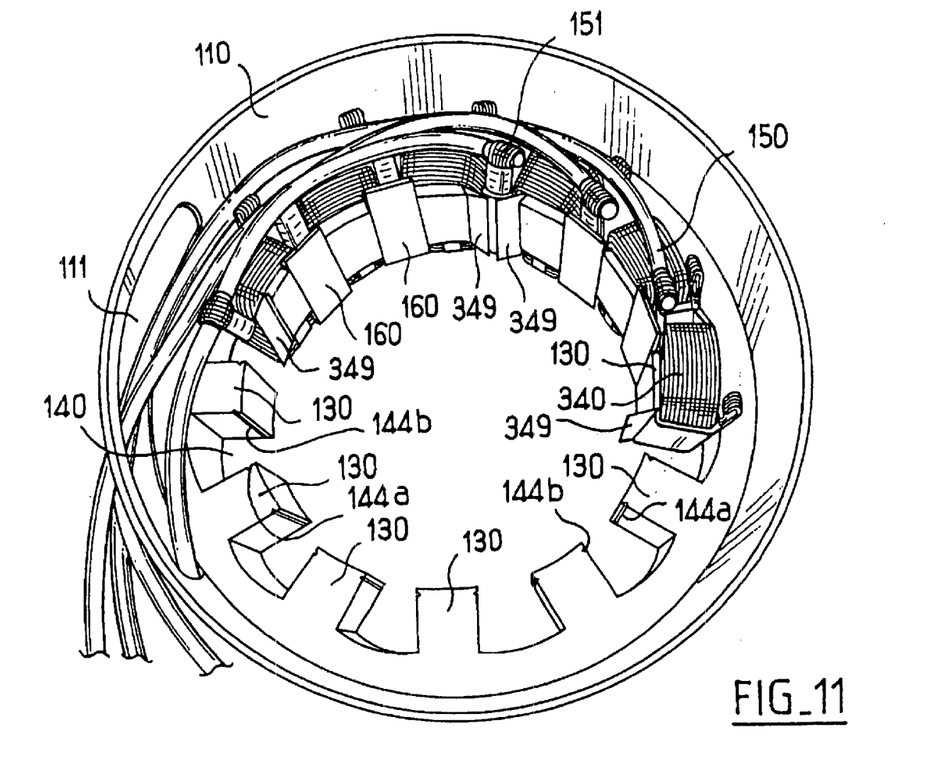
FIG. 11 is a diagram showing how sets of coils are put into place on the stator during manufacture thereof.

In the example described, sets of two coils 340 are made up and subsequently mounted on the corresponding teeth 130, as shown in FIG. 11. Sheets 349 of insulation are interposed between the teeth and the bottoms of the slots and the coils. The ends of these sheets 349 can be seen in FIGS. 5 and 11.

Figure 4:
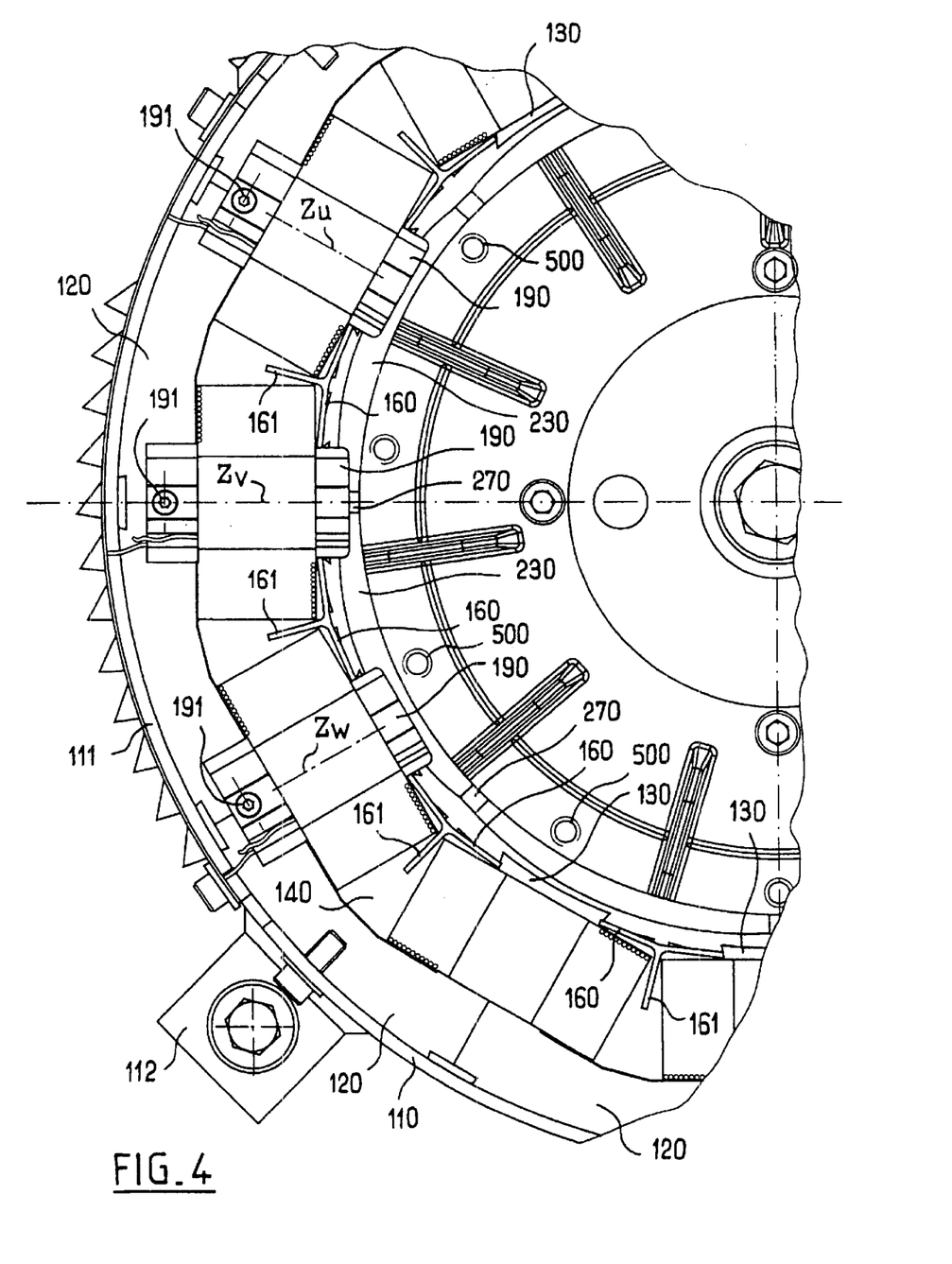
FIG. 4 is an enlarged view of a detail IV of FIG. 2.

As more and more coils 340 are mounted on the teeth 130, pieces of support shim 160 are slid into the cutouts 144a, 144b so as to close off the slots 140. As can be seen in FIG. 4, these pieces of shim 160 include partitions 161 extending between the portions of the two coils 340 that are received in the corresponding slot 140.

Figure 12:
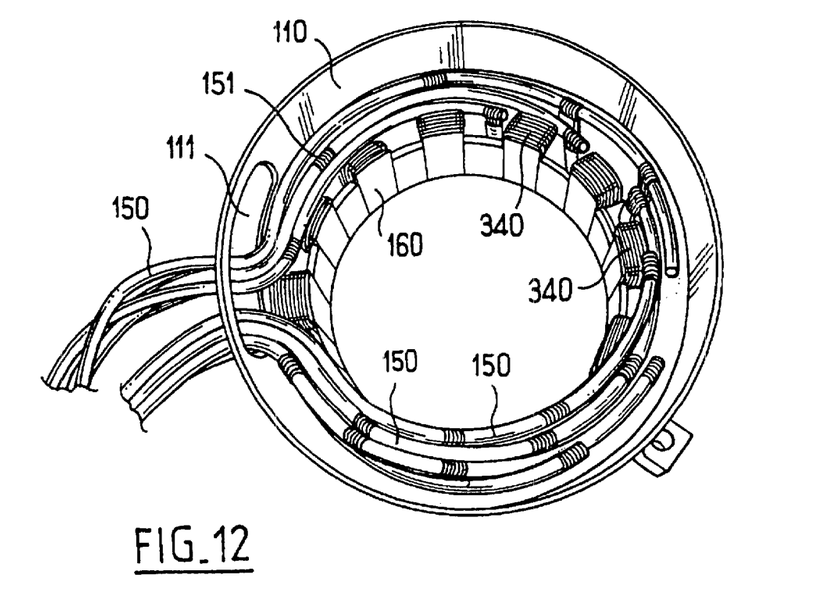
FIG. 12 is a view analogous to FIG. 11, in highly diagrammatic and simplified form once all of the sets of coils have been put into place, to show the circular paths followed by the current-feed cables.

Once all of the coils 340 are in position, the cables 150 extend along substantially circular paths on one side of the magnetic circuit of the stator, being set back from the free ends 131 of the teeth, as shown in FIG. 12, these cables being attached to one another by collars, and then the stator is impregnated with an insulating resin in conventional manner. The particular electrical interconnections between the twelve coils is shown in FIG. 20, but that is merely one example.

It will be understood that it is particularly advantageous to use individual coils 340 installed on teeth of non-constant width in the manner described above, since that makes it much easier to replace coils 340. To replace a coil 340, once the rotor 200 has been removed, it suffices to unsolder the ends 344a and 344b of a coil from the corresponding stripped portions 151 and to remove the pieces of shim 160 concerned, whereupon the coil 340 can be extracted. A resin-impregnated replacement coil 340 can then be put into place by being engaged on the previously released tooth 130, after which its ends 344a and 344b can be soldered to the stripped portions 151. The convergence of the sides 141a and 141b of the tooth 130 towards the rotor and the corresponding shape of the inside section of the coil contribute to preventing the coil from moving on the tooth 130. A repair can be performed on site without it being necessary to return the machine to the manufacturer, and without it being necessary to re-impregnate the stator, thus making it possible to shorten repair time. The motor 10 can advantageously be shipped together with one or more replacement coils 340.

The rotor 200 is described below with reference to FIGS. 13 to 18. The rotor comprises a non-magnetic shaft 210 shown in isolation in end view in FIG. 15, having a central portion 211 that is generally annular in shape, and at its periphery a plurality of splines 220 serving for securing pole pieces 230, each constituted by a stack of identical magnetic laminations that are superposed and clipped together. The use of superposed magnetic laminations serves to reduce losses due to induced currents. In cross-section, the splines 220 are generally T-shaped. The pole pieces 230 are not magnetically interconnected, since the shaft is made of a non-magnetic material.

Figure 17:
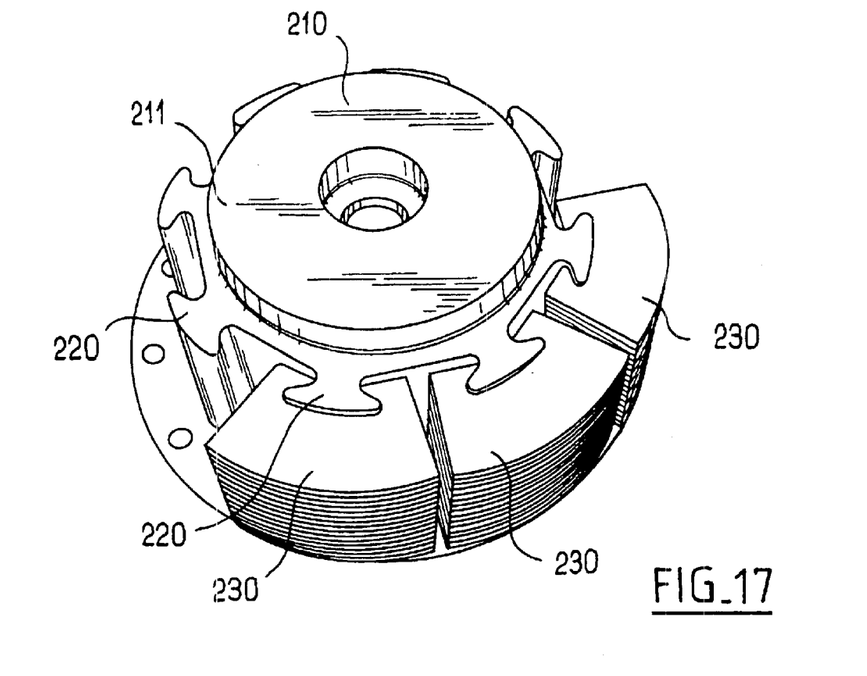
FIG. 17 shows how pole pieces are assembled on the rotor shaft.

FIG. 17 shows a pole piece 230 in isolation as seen from above. Each pole piece 230 has a cutout 250 of a shape adapted to engage on a spline 220 by sliding parallel to the axis of rotation of the rotor. The splines 220 are formed integrally with the central portion 211, out of aluminum, by being machined in the present example, but other techniques such as drawing or injection could be used. It will be observed that the pole pieces 230 in the example described are not engaged on anything other than the splines on the shaft. The splines 220 could be replaced by separate bars secured to endpieces, providing the rotor is relatively short and not intended to rotate at high speed.

In the embodiment shown, the cutout 250 is symmetrical about a midplane passing through the middle thereof and containing a radius. It has a bottom 251 for coming into contact with the radially outer face 221 of the corresponding spline 220. The bottom 251 connects opposite sides 252 each having a first rounded portion 252a of radius of curvature $R_a$, an oblique rectilinear intermediate portion 252b at a non-zero angle ii with the radius passing through the middle of the bottom 251, and a second rounded portion 252c of radius of curvature $R_c$. In the embodiment described, $R_a$ is 3 mm, $R_c$ is 5 mm, and the angle ii is 70°. The cutout 250 has a narrow opening thus engaging on a spline 220.

Figure 18:
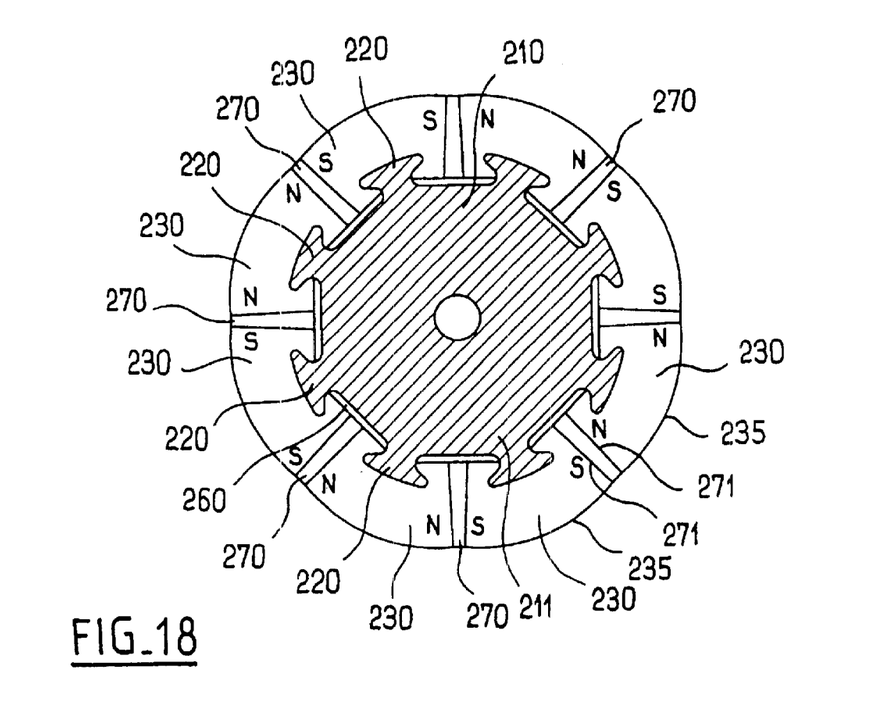
FIG. 18 is a diagrammatic cross-section of the rotor shaft after the magnets and the pole pieces have been put into place.

In general, the angle ii depends on the nature of the materials used for making the shaft 210 and the pole pieces 230, and it can be determined by computation using finite elements. The shape of the section of each spline 220 is substantially complementary to that of the cutout 252, excepting the presence of a chamfer 221a at the edge of the radially outer face 221 of the spline 220. Each side 222 of the spline thus has a rounded portion 222a having the same radius of curvature $R_a$ as the rounded portion 252a, a rectilinear portion 222b parallel to the portion 252b when the pole piece 230 is in place on the shaft 210, and a rounded portion 222c having the same radius of curvature $R_c$ as the portion 252c. The radially inner edges 233 of the pole piece 230 situated on either side of the slot 250 are set back from the regions 213 of the shaft 210 situated between the splines 220, as can be seen in FIGS. 17 and 18, in particular. A gap 260 is thus left between two adjacent splines 220, the pole pieces 230 engaged on the splines, and the shaft 210.

Figure 19:
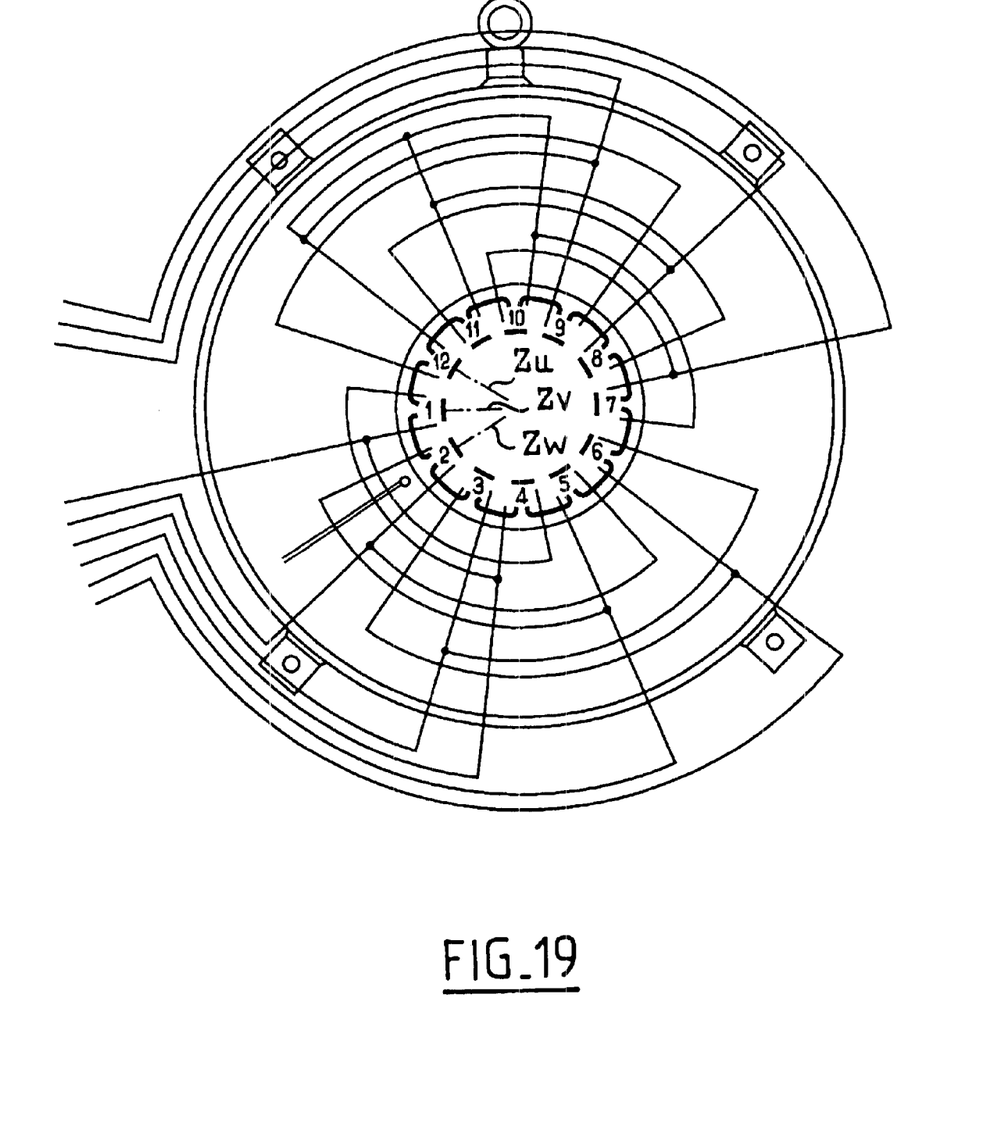
FIG. 19 is a diagram showing one way in which the coils can be electrically interconnected (coils numbered 1 to 12).

Permanent magnets 270 of trapezoidal section are disposed radially, being inserted between the pole pieces 230, as shown in FIG. 18. When observed along the axis of rotation of the rotor, each magnet 270 is slightly wedge-shaped, with its width tapering radially outwards. Each magnet 270 is magnetized transversely and can be formed as a single piece or it can be built up from a plurality of magnetic elements placed end to end. Same-polarity magnetic poles of two adjacent magnets 270 are directed towards the pole piece 230 situated between the magnets 270, as shown in FIG. 19. In the example shown, each magnet 270 is made up of three magnetic elements 270a, 270b, and 270c placed end to end along the axis of rotation X of the rotor, as can be seen in FIG. 3. In the example shown, the magnets 270 extend over practically the entire radial size of the sides 238 of the pole pieces 230 and they are in contact therewith.

The magnets present low electrical resistivity, but they are not subjected to heating that runs the risk of demagnetizing them because of the protection provided by the pole pieces against pulsating flux.

Figure 16:
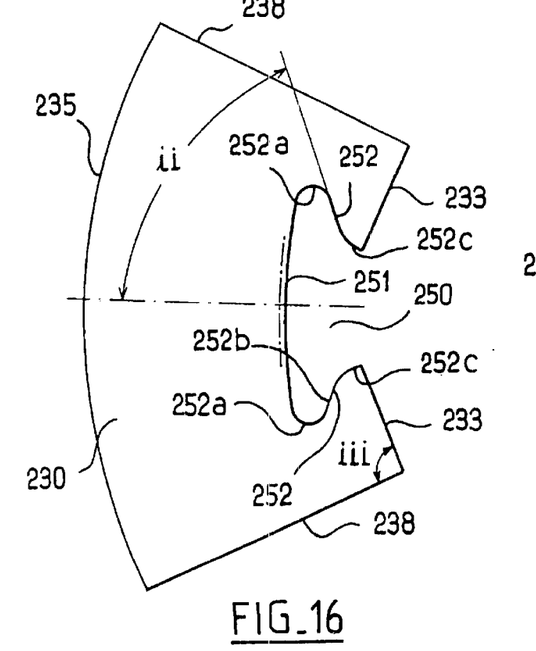
FIG. 16 is a plan view of a pole piece of the rotor shown in isolation.

The angle formed between the opposite plane faces of the magnets 270 that come into contact with the pole pieces 230 is quite small, being a few degrees only. The angle iii between the side 238 of a pole piece 230 and the adjacent edge 233 in the example shown in FIG. 16 is equal to 92.4°.

The radially outer side 235 of a pole piece 230 is of circular cross-section, of radius of curvature that is smaller than the maximum radius of the rotor such that each pole piece 230 presents an outside face 235 which forms a slightly outwardly convex lobe, as can be seen in FIG. 18. The bulging shape of the pole pieces 230 makes it possible to reduce torque ripple and also to establish a flow of cooling air. In the example described, the shape of the lobe 235 and the ratio of the radial dimension of the magnets over their width is selected so as to have $L_q=L_d$ so that the motor turns without the reluctance effect. $L_d$ is inductance on the forward axis and $L_q$ is inductance on the quadrature axis (traditional notation).

The pole pieces 230 are arranged in such a manner that when the rotor 200 turns at a speed greater than a predetermined speed, the housings formed between said pole pieces 230 and receiving the magnets 270 tend to become wider under the effect of centrifugal force, with such widening tending to diminish when the speed of rotation decreases again.

The radial size of the magnets 270 is selected in such a manner that when they are put into place in the corresponding housings in the rotor, their radially outer ends are set back from the radially outer edges of the pole pieces adjacent to the magnets.

The magnets 270 are installed so as to engage in the gaps formed by the housings becoming enlarged in the manner described above when the rotor turns at a speed greater than said predetermined speed such that the pole pieces 230 clamp against the magnets 270 when the speed of the rotor drops back below said predetermined speed. The presence of the gaps 260 makes it easier to put the magnets 270 into place. It will be understood that this provides means that are simple and effective for pressing the magnets 270 against the pole pieces 230. To fix the magnets 270, the rotor 200 can be rotated at a speed that is 10% greater than its nominal speed of rotation, for example, or even 20% greater than said nominal speed. The magnets 270 are easily put into place since it is not necessary to insert them initially between the pole pieces 230 with any very great force, the final positioning of the magnets 270 taking place automatically when the rotor 200 is rotated. In addition, by causing the rotor to turn faster or slower, it is possible to obtain greater or lesser displacement of the pole pieces 230 and the magnets 270 and to act to a small extent on the outside diameter of the rotor. This can make it possible to make magnets 270 and pole pieces 230, and also the stator 100, using manufacturing tolerances that are much slacker, since it is possible to adjust the outside diameter of the rotor 200 to a desired value by causing it to rotate at a faster or slower speed.

The magnets 270 present low electrical resistivity, but they are not subjected to heating that runs the risk of demagnetizing them because of the protection provided against pulsating flux by the pole pieces 230 at high speeds.

The wedge-shape of the magnets 270 allows compression forces to be exerted on the portions of the pole pieces 230 that contain the splines 220 so as to tend to close the cutouts 250 onto the splines 220, with this effect being increased with increasing speed, such that the assembly is self-locking. The above-mentioned compression forces enable the width of the pole pieces on either side of a spline to be reduced, and thus make it possible to benefit from greater width in the connection between the spline and the shaft and thus make it possible for the shaft to be made out a material that is not mechanically as strong as non-magnetic steel, but is much less expensive and much lighter in weight, such as aluminum.

The end cheek-plates 280 and 290 are fixed to the shaft 210 at opposite ends thereof to prevent the pole pieces 230 and the magnets 270 from moving axially. The cheek-plates define a stage of the machine. The rotor 200 can have a plurality of stages subdivided by intermediate cheek-plates, and the number of magnets 270 per stage can lie in the range 4 to 64, for example, possibly being equal to 8 as in the example shown for an 8-pole motor. When a plurality of stages are used and are separated by intermediate cheek-plates, the number of cheek-plates is preferably equal to the number of stages plus one.

The cheek-plates 280, 290 can be made of aluminum, for example, or out of non-magnetic steel. The cheek-plates are fixed on the shaft 210 by means of bolts 281. Tapped holes 500 are made through the peripheries of the cheek-plates 280, 290 so as to enable balancing screws to be engaged.

Figure 13:
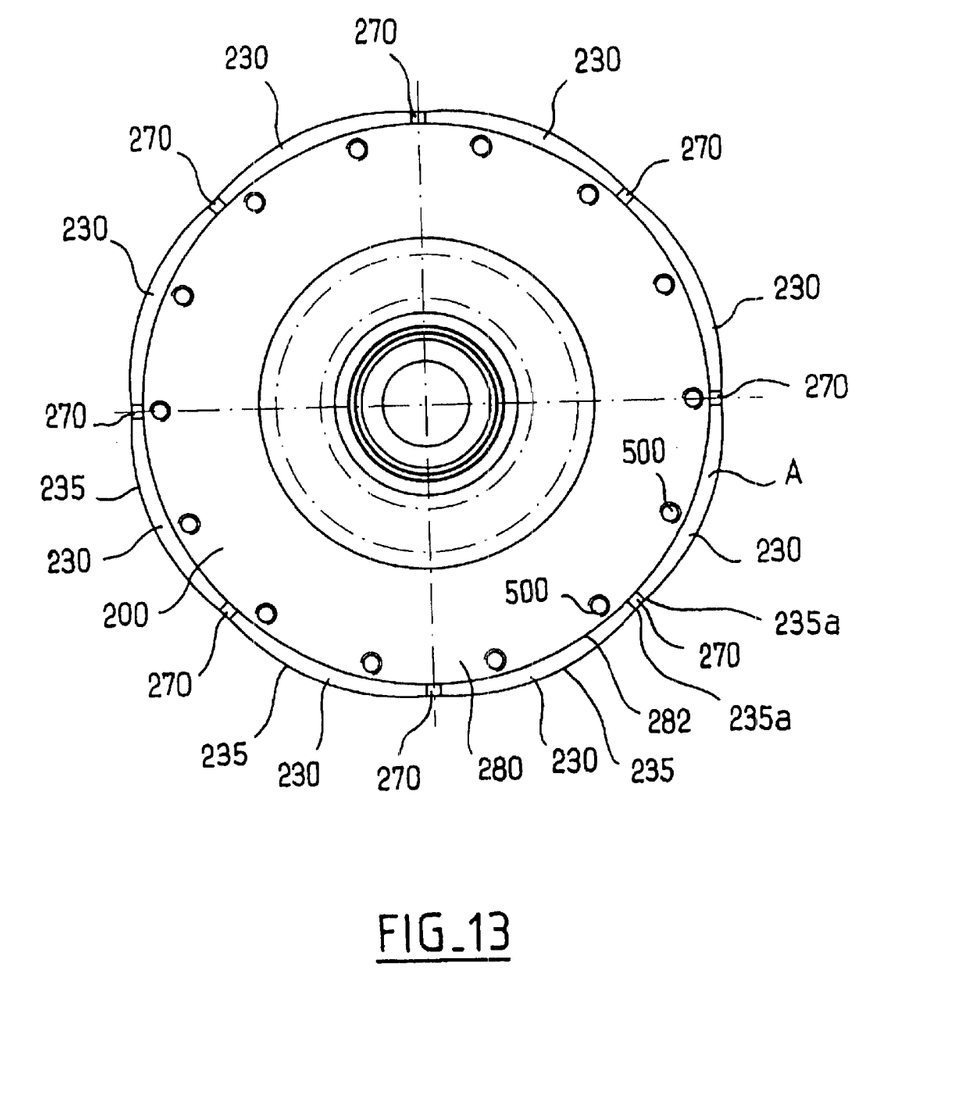
FIG. 13 is a diagrammatic front view of the rotor.
Figure 14:
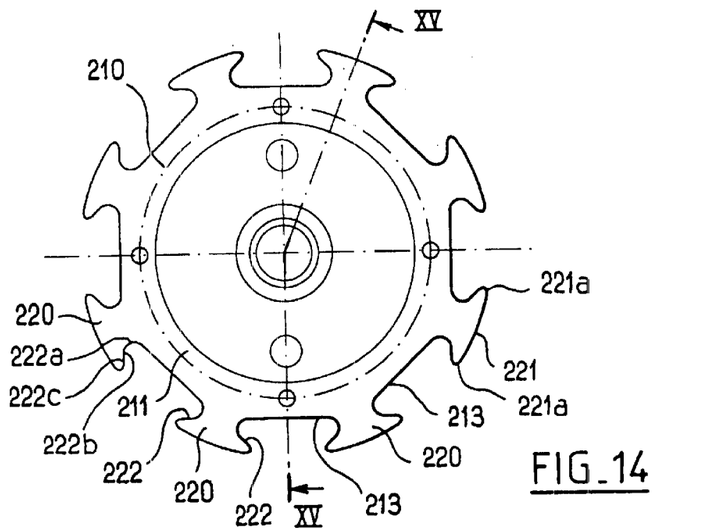
FIG. 14 is an end view of the rotor shaft shown in isolation.
Figure 15:
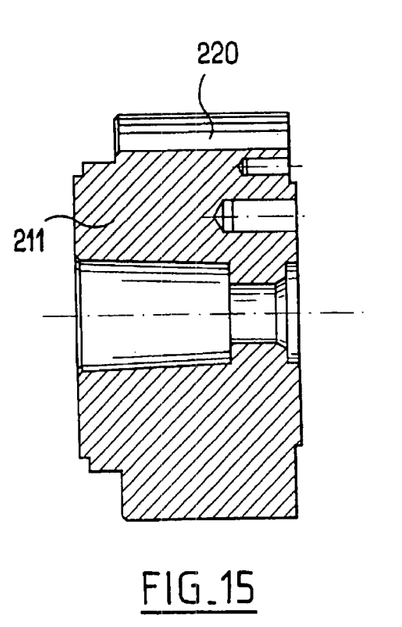
FIG. 15 is a diagrammatic axial section on XV—XV of FIG. 14.

As can be seen in FIG. 13, in particular, the cheek-plate 280 has a circular radially outer edge 282 which is set back from the radially outer edge 235 of the pole pieces 230 and the radially outer edges of the magnets 270, which lie substantially level with the ends 235a of the bulging faces.

An annular zone A is thus provided around the cheek-plate 280 in which it is possible to read the magnetic field of the magnets 270 of the rotor by means of detectors 190 of the kind shown in FIG. 4. In FIG. 4, it can be seen that the detectors 190 can overlap the rotor 200 to a small extent because the cheek-plate 280 is in a slightly set-back position.

In the embodiment described, there are three detectors 190, since the motor is a three-phase motor, with each detector comprising a Hall effect sensor arranged to detect the magnetic field over the peripheral region A of the rotor 200 around the cheek-plate 280. The magnetic field is read along an axis parallel to the axis of rotation of the rotor, the Hall effect sensor overlapping the peripheral region A. The detectors 190 are mounted on three consecutive teeth 130 of respective axes $Z_u$, $Z_v$, and $Z_w$ situated in the vicinity of the opening 111.

In FIG. 4, it can be seen that the detectors 190 can overlap the rotor 200 to a small extent because the cheek-plate 280 is in a slightly set-back position.

Each detector 190 is fixed by a screw 191 on a tooth 130 of the stator, said screw 191 being engaged in a hole 125. As can be seen in FIG. 4, each detector 190 extends along the radial axis $Z_u$, $Z_v$, or $Z_w$ of the associated tooth and passes through the coil 340 engaged on that tooth. The coils 340 are provided for this purpose with an inside section of length that is large enough to enable the detector 190 to be passed. The space left between a coil and the corresponding tooth for passing the detector can be about 5 mm, for example, with such a space serving to insulate the coil from the tooth where there is no insulation 349.

It is advantageous to read the magnetic field of the permanent magnets 270 directly because that makes it possible to avoid adding special elements to the rotor whose sole purpose is to enable the angular position of the rotor to be read. This simplifies manufacture of the rotor and improves reliability. In addition, mounting detectors 190 in the gap between the coils 340 and the teeth 130 is particularly compact, while nevertheless providing easy access to the detectors 190 in order to replace them, should that be necessary.

Each detector 190 is positioned inside a coil 340 of given phase. Each detector 190 makes it possible to detect which polarity of the rotor lies in register with the associated coil (and thus the corresponding phase) at a given instant. Each detector 190 delivers a high signal or a low signal depending on the polarity it detects. Each detector 190 has an electronic circuit for shaping the signals delivered by the Hall effect sensors so as to reduce sensitivity to interference. Depending on the position of the rotor, the various signals delivered by the detectors 190 can take up six possible combinations, each change in the triplet constituted by the states of the detectors 190 corresponds to a determined angular position of the rotor. This makes it possible to determine the angular position of the rotor at precise instants, and to compute the position of the rotor between these instants by interpolation, given knowledge of its speed. The coils can thus be excited in optimum manner with the desired amount of phase shift. The electrical current carried by each coil can thus be reduced to zero and change direction whenever a magnet lies on the axis of the corresponding tooth. Unlike a reluctance motor which operates in attraction only, the above-described motor operates both in attraction and in repulsion, and enables a large amount of torque to be generated.

Each detector 190 also has a temperature sensor.

Knowing the temperatures of the coils 340 of the various phases makes it possible to detect possible misfunction of the motor.

On at least one of its cheek-plates 280 and 290, the rotor 200 has cooling fins 291 which can be seen in FIG. 1, in particular. It will be observed that an additional cooling effect is obtained by the presence of the lobes 235 formed by the pole pieces 230 at the periphery of the rotor, which make it possible to generate a flow of cooling air within the inside of the motor.

The motor as described above in detailed manner presents numerous advantages, namely:

its particularly compact structure enables it to be mounted in a cantilevered-out position at the end of a shaft, thus making it possible to reduce the number of bearings and to reduce mechanical losses due to friction, and also to reduce problems of lubrication;

the rotor can turn at a high speed of rotation without running the risk of magnets becoming detached or of the magnets becoming overheated, since the magnets are little exposed to currents induced on the surface;

the individual coils are easy to install and to replace, and there is no need to re-impregnate the stator;

the mass of the magnets is quite small, and there is no need for them to be fractioned;

the number of teeth and the number of coils is relatively small, thus facilitating manufacture;

the heads of the coils are very short, thus making it possible to obtain a structure that is compact axially;

the phases are separated electrically without contact and without crossover;

the turns of the coils are touching, thereby ensuring that the slots are well filled; and torque ripple can be made negligible.

The invention is not limited to a synchronous motor and it is also applicable to manufacturing a generator. The rotor can be internal or external.

The electrical power of the machine can lie in the range 1 kilowatt (kW) to 750 kW, for example. The speed of rotation of the rotor can lie in the range 1000 rpm to 10,000 rpm, for example. A machine of the invention can also find applications when speed is below 1000 rpm. The outside diameter of the machine can lie in the range 50 mm to 1 meter (m), for example; in the most widespread applications, the outside diameter can lie in the range 100 mm to 600 mm.

The invention is not limited to some particular number of poles nor is it limited to the stator being powered with three-phase AC. Electricity can be polyphase having $n_{phases}$ phases, where $n_{phases}$ is not equal to three.

The shaft can be made out of non-magnetic materials other than aluminum, for example aluminum alloys.

Although less advantageous, magnets in the form rectangular parallelepipeds or having some other shape could also be used, possibly in combination with magnets that are wedge-shaped.

The teeth of the stator can have a face facing the rotor that is of a shape that is not circularly cylindrical about the axis of the rotor.

The slots can be half-closed. claims

What is claimed is:

1. An electric machine, comprising:

a stator;

a permanent magnet flux-concentrating rotor having permanent magnets and non-magnet pole pieces, the permanent magnets being engaged between pole pieces; and at least one magnetic-field detector mounted on the stator in such a manner as to detect a magnetic field of the permanent magnets in a location that overlaps a peripheral region of the rotor when the machine is observed along a direction that is parallel to the axis of rotation of said rotor.

2. A machine according to claim 1, wherein power supply to said motor is polyphase electricity having n phases, and wherein said motor includes n detectors fixed on teeth of the stator.

3. A machine according to claim 2, wherein said teeth are consecutive teeth.

4. A machine according to claim 3, wherein said machine has a case and said detectors are grouped together facing an opening in said case.

5. A machine according to claim 1, wherein the stator has a magnetic circuit and said detectors are fixed on one axial end of said magnetic circuit of the stator.

6. A machine according to claim 1, wherein each detector extends along a radial axis of a tooth.

7. A machine according to claim 1, wherein each detector includes a Hall effect sensor.

8. A machine according to claim 1, wherein each tooth of said stator receives an individual coil.

9. A machine according to claim 8, wherein said individual coil comprises a bundle of insulated wires, the bundle being substantially flat and wound around a winding axis in such a manner as to form a plurality of superposed turns, said bundle having a cross-section in the superposed turns which has a long dimension that extends substantially perpendicularly to said winding axis of the coil.

10. A machine according to claim 8, wherein the individual coil co-operates with the tooth to leave a gap which receives at least one of said detector and electrical conductors connected to said detector.

11. A machine according to claim 1, wherein the rotor includes at least one cheek-plate made of a non-magnetic material, said cheek-plate having an outside radial edge extending slightly set-back from the outside radial edges of the magnets and of the pole pieces in such a manner as to provide an annular region in which said magnetic field can be detected by said at least one magnetic field detector.

12. A machine according to claim 1, wherein the stator does not have pole swellings.

13. A machine according to claim 1, wherein the detector comprises a temperature sensor.

* * * * *

UNITED STATES PATENT AND TRADEMARK OFFICE
CERTIFICATE OF CORRECTION

PATENT NO. : 6,683,397 B2
DATED : January 27, 2004
INVENTOR(S) : Pascal Gauthier et al.

It is certified that error appears in the above-identified patent and that said Letters Patent is hereby corrected as shown below:

<u>Title page,</u>
Before Item [21], delete the sentence "This patent is subject to a terminal disclaimer."

Signed and Sealed this

Thirteenth Day of April, 2004

JON W. DUDAS
*Acting Director of the United States Patent and Trademark Office*